United States Patent Office 2,809,895
Patented Oct. 15, 1957

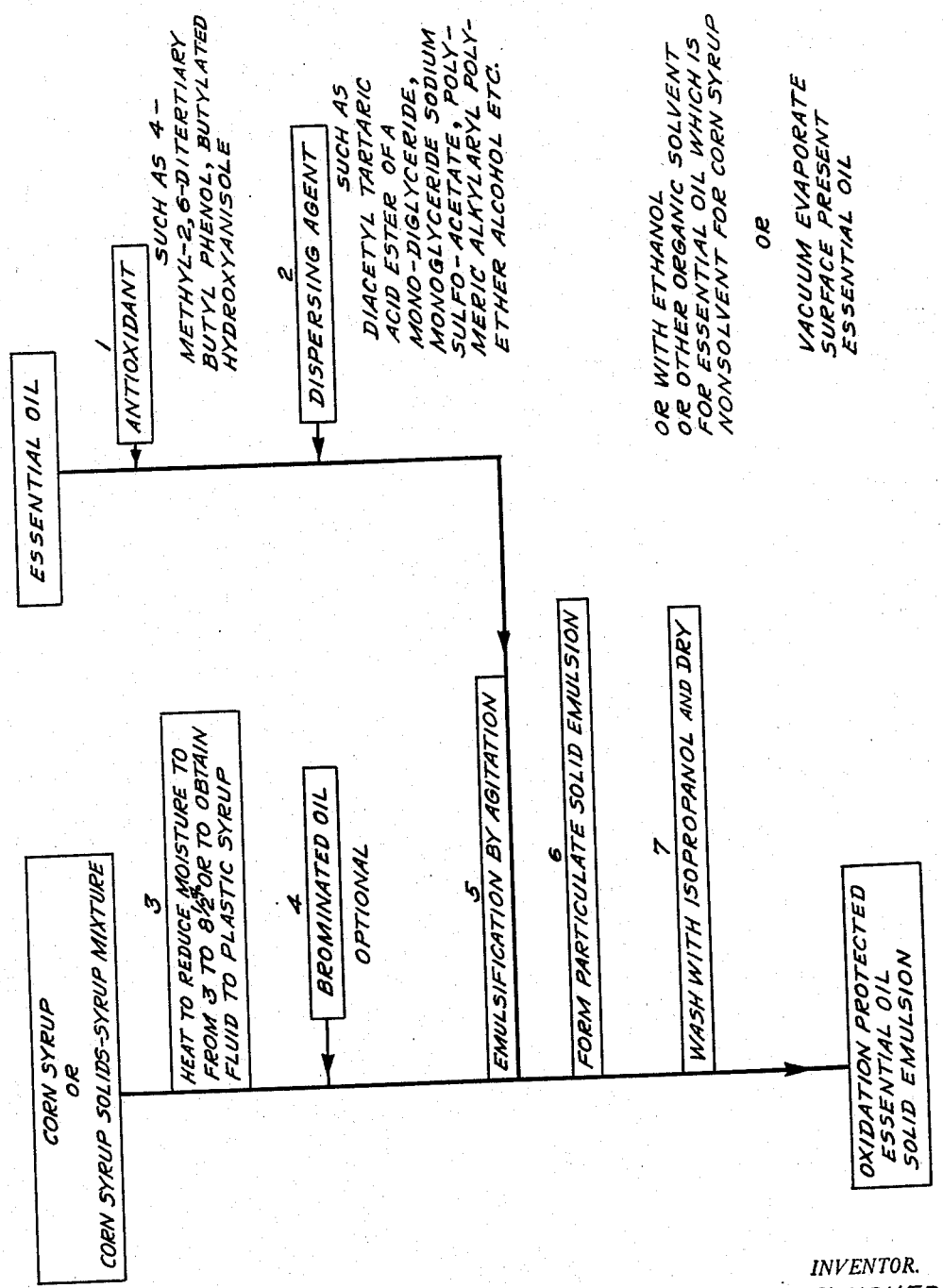

2,809,895

SOLID FLAVORING COMPOSITION AND METHOD OF PREPARING THE SAME

Horton E. Swisher, Upland, Calif., assignor to Sunkist Growers, Inc., Los Angeles, Calif., a corporation of California Application July 5, 1955, Serial No. 519,719

8 Claims. (Cl. 99—140)

This invention relates to a solid essential oil containing composition suitable for use as an ingredient of various foods, pharmaceuticals, perfumes, soaps, cosmetics and other products. More particularly, my invention is concerned with a method for forming a finely dispersed essential oil-corn syrup emulsion which is solidified and further treated to give a particulate oxidation protected essential oil product.

Essential oils, both cold pressed and concentrated, are widely used as flavoring and scenting materials in the preparation of various consumer products, and while many attempts have been made in the past to preserve the fresh fruit aroma and flavor of the essential oil, the problem has been difficult of solution because of the extreme sensitivity of these oils to the action of heat, light, air and moisture. The formation of terpene compounds having extremely disagreeable odors and tastes, as a result of oxidation of cold pressed essential oils, is a constant hazard when they are stored in the presence of air and moisture. An oil which has "gone terpy" is, of course, valueless as a flavoring or scenting agent.

When essential oils are used as flavoring constituents of beverages it is common practice to weight them by incorporating brominated vegetable oil to give a specific gravity approximating that of the liquid to which they are added. Unfortunately the resulting increased cloud stability of the beverage is accompanied by the undesirable chemical taste and odor of the brominated oil.

The objects of my invention are, therefore; to preserve the natural flavor of the essential oils and especially the more desired, more oxidation susceptible cold pressed oils; to permit their extended storage without deterioration; to produce an essential oil bearing composition suitable for direct use in the preparation of food products; to produce a water soluble essential oil bearing solidified composition from which the oil is readily available and which has every characteristic of freshly extracted cold pressed oil, and to obviate the chemical taste and odor associated with essential oils which have been weighted with brominated oils.

The nature of my invention will be evident from an examination of the drawing, a flow diagram, which illustrates the various steps of my process as indicated by the reference numerals. Basically the process consists in: emulsifying, at a temperature of between about 85° C. and 125° C., an essential oil, to which an antioxidant and a dispersing agent have been added, in a corn syrup solids solution having a moisture content of between 3% and 8½%; forming a particulate solid emulsion from the hot fluid emulsion by extruding into pellet form, or by agitating in a hot immiscible liquid, cooling rapidly to cause solidification of the emulsion globules and separating from the cooled immiscible liquid, or by cooling to solidification, and grinding; washing the resulting particles with an essential oil solvent and drying them by vacuum removal of solvent to produce a free flowing relatively non-hygroscopic granular material. This end product is an oxidation protected solid essential oil dispersion consisting of amorphous particles of corn syrup solids which form a matrix for the essential oil and protect it from contact with oxygen and moisture.

Prior to its addition to the hot corn syrup solids solution, it is critical that the essential oil be treated as indicated by step 1 in the drawing with minor amounts of 4-methyl-2,6-ditertiary butyl phenol, butylated hydroxyanisole, or some other oil soluble, heat stable antioxidant, since the heat of the molten corn syrup will very rapidly cause the degeneration of some of the constituents of the essential oil into undesirable terpene compounds in the absence of such antioxidant treatment.

In addition, a minor amount of a dispersing agent is added (step 2) to the essential oil or with it, since, without a dispersant, the essential oil and corn syrup will not form the required finely dispersed emulsion, but will form a poor emulsion consisting of relatively few large individual droplets of essential oil within the corn syrup. Preparing a particulate solid emulsion from such a poorly dispersed oil product would result in greater exposure of the oil to the atmosphere at the surface of the particles and a consequent loss of oil by evaporation or by the subsequent step of washing. Furthermore, the presence of large globules of oil in the product would prevent complete and even distribution of oil in the ultimate product to which my protected oil may be added. I have found that the following representative emulsifiers are suitable for use; diacetyl tartaric acid ester of a mono-diglyceride, monoglyceride sodium sulfo-acetate, polymeric alkylaryl polyether alcohol, polyethylene glycol fatty acid esters, sodium lauryl sulfate, vegetable oils, glyceryl monostearate, acetylated monoglycerides, citrus stearoptene, lecithin, gum arabic, locust bean gum, guar gum, tragacanth gum, pectin, pectin albedo, agar and algin.

As an example of the unexpected results attained by the addition of an emulsifier according to my invention, the maximum percent of orange oil it was possible to incorporate in a corn syrup solids solution without emulsifier to give a reasonably fine oil dispersion was 6.02% before vacuum removal of surface present oil and 4.62% after such removal. When using monoglyceride sodium sulfo-acetate, a preferred emulsifier, it was possible to incorporate 12.00% oil in the corn syrup solids solution before and 11.87% after vacuum removal of surface present oil. The 23% oil loss for the first sample as a result of vacuum treatment after grinding to 20 mesh size shows clearly that no finely dispersed emulsion was formed as it was for the emulsifier treated sample which lost only 1% of its oil after grinding. This is further shown by the fact that when the granular products were dissolved in water to give .1% oil in water emulsion samples, the untreated oil containing sample lost 33.0% of its cloud after 1 hour, 48% after 3 hours, 64% after 6 hours and 87% after 24 hours; while the treated oil containing sample lost 0% after 1 hour, 4% after 3 hours, 8% after 6 hours and only 26% after 24 hours. Loss in cloud corresponds to a decrease in the amount of oil remaining in the dispersion and results from the coalescence of large oil globules and separation of the oil at the surface.

In practicing my invention, the corn syrup or corn syrup solids-syrup mixture (the corn syrup solids solution), which is to serve as the continuous phase in the emulsion, is heated in accordance with step 3 so that it will be in the form of a relatively free flowing liquid which may be easily agitated upon addition of essential oil. In addition, the molten material must contain no more than 8½% moisture and no less than 3% moisture. In the event the corn syrup solids solution has a moisture content of greater than 8½%, sufficient heat must be applied to reduce the moisture to within the 3% to 8½% range, since if the corn syrup solids solution contains more than about 8½% moisture, difficulty will be encountered in forming a particulate solid emulsion and in maintaining it in a solid condition. On the other hand, if the moisture content is less than about 3%, excessively high temperatures, which cause the volatilization and escape of essential oils as well as their more rapid oxidation, will be required to maintain the syrup in a fluid condition.

Where, for example, ordinary commercially available corn syrup is employed, it should be heated to a minimum of about 121° C. and preferably to 125° C. in order to reduce the moisture content to within that range that will permit solidification upon cooling of the corn syrup-essential oil emulsion and to give satisfactory storage life. In the event that it is desired to start with a material which requires little or no moisture removal, I have discovered that a mixture of approximately 85% corn syrup solids, having about a 3½% moisture content, and 15% commercial grade 83° Brix corn syrup, provides a material which requires no moisture removal but requires only sufficient heat to render the mixture sufficiently fluid for the subsequent emulsification of essential oil therewith.

After heating but before solidification and while the corn syrup solids solution is in a fluid condition, I add the essential oil to the solution and agitate the resulting mass as shown at 5 in the drawing in such a manner as to avoid incorporation of air as much as possible and to insure formation of a finely dispersed emulsion. If desired the emulsification process may be accomplished by agitation in an atmosphere of inert gas to further avoid adding air to the product.

The fluid material is then formed into a particulate solid emulsion (step 6) by extrusion to form solid particles or else it is cooled to solidification and then ground to reduce it to granular form. An alternative method for forming the particulate solid emulsion depends upon my further discovery that the essential oil bearing corn syrup emulsion may, while still in a semiplastic condition, be introduced into a liquid in which the corn syrup is not soluble and the resulting mixture subjected to strong agitation to cause subdivision of the corn syrup emulsion into small particles. I have found that the corn syrup-essential oil emulsion is insoluble in edible oils such as vegetable or mineral oils and these materials may be utilized in this alternative process. I have found that the nonsolvent liquid must be heated to a temperature approximating the melting point of the corn syrup-essential oil emulsion so that the emulsion will not solidify before it can be subdivided as a result of agitation of the liquid. The particle size can be controlled by the rate of agitation; the greater the degree of agitation, the smaller the particle size. Immediately upon formation of the small particles I cool the mixture rapidly or quickly incorporate it in a cool body of a lower alcohol or vegetable or mineral oil in order to cause solidification of the corn syrup-essential oil emulsion in particulate form. The solidified particles may then be removed from the immiscible liquid in a suitable manner as by decanting or straining.

The size of the particles is of no particular criticality, since the size will depend upon the ultimate use to be made of my product. For example, it may be desired, in the manufacture of a dry beverage product, to incorporate 30 mesh size particles of my product in the mix, while in the preparation of a composition in which the essential oil is used as a scenting agent, it may be desired to employ a much smaller particle size.

The intermediate unwashed solid product in particulate form made in accordance with my invention may be stored in closed containers and will retain its flavor and essence for longer periods of time than an untreated essential oil. However, I have found that even though the product is dry to all appearances, a small part of the essential oil originally incorporated in the corn syrup has been released from the interior of the corn syrup mass or is otherwise present at the surface of the ground or extruded particles. A product which has essential oil present at the surface of the particles becomes unsuitable for use much more rapidly than a product not having such surface oil. Surface present essential oil is not only undesirable because it becomes "terpy" itself, but because it exerts a pro-oxidant effect upon other oils or easily oxidized substances which it may contact.

I have discovered that the latter objection may be overcome by washing the surface retained potentially pro-oxidant essential oil from the corn syrup solids particles with a suitable solvent such as isopropanol or ethanol or some other solvent which will dissolve the essential oil, but not corn syrup, and then drying these particles to remove solvent as indicated by step 7 of the drawing to give a product which is protected against the effects of oxidation. This step is essential to the production of the most satisfactory corn syrup-essential oil solid emulsion and is responsible for the long storage life of my product as evidenced by the results of accelerated storage tests. The oil removed from the surface of the particles may be recovered and recycled in known manners if desired.

As an alternative, though not preferred treatment, it is possible to subject the solid particles to a high vacuum in order to remove the free essential oil by evaporation.

Reference numeral 4 refers to the optional step of introducing brominated oil to corn syrup prior to emulsification. This step is not necessary in the production of my product except in the event that it is to be used in the preparation of a bottler's base. In this event brominated vegetable oil is a required additive to essential oil since its addition results in a weighted essential oil having an increased specific gravity which will have a decreased tendency to separate from the body of a beverage prepared therewith.

Of course, the brominated oil could be added to the essential oil in the same manner that monoglyceride sodium sulfo-acetate or the other listed substances are added to it, but I have found that the usual undesirable chemical taste and odor associated with brominated oil treated essential oils can unexpectedly be completely eliminated by incorporating the brominated oil in the corn syrup prior to the emulsification step.

It is thought that the high degree of bromination of the vegetable oils (glycerol esters of unsaturated fatty acids) required to give the desired high specific gravity results in the presence of minute amounts of free bromine, hydrobromic acid and short chain bromine cleavage products of the fatty acids or other undefined products, which are responsible for the chemical taste and odor or brominated oil containing beverages. I believe that incorporation of this oil in the corn syrup prior to emulsification, in accordance with my invention, results in the reaction of the aldehyde or hydroxyl groups of the corn syrup with bromine supplying cleavage compounds, thus effectively eliminating their taste and odor. In addition, it is thought that the corn syrup solids matrix seals the brominated oil away from contact with moisture and air thus discouraging hydrolytic and oxidative degeneration of the brominated glycerol esters of the unsaturated fatty acids.

Because of this discovery it is possible to obtain all of the benefits of brominated oil without the heretofore serious objections thereto. It will no longer be necessary to sacrifice either cloud or taste. The use in beverages and beverage bases of a dry corn syrup solids-essential oil-brominated oil emulsion in solid particle form, made in accordance with my discovery, will guarantee both cloud stability and taste satisfaction.

As a specific example of my process, 208 grams of cold pressed orange oil were added to a quantity of 83° Brix corn syrup which after heating to a temperature of 122° C. weighed 1150 grams. The orange oil had first been stabilized by incorporation of .05% 4-methyl-2,6-ditertiary butyl phenol therein. In addition, 17 grams of "Emargol" (a blend of monoglyceride sodium sulfoacetate and mono-diglyceride) and 6¼ grams of glycerine had been added to the orange oil in order to aid in emulsification. The orange oil was added to the corn syrup when its temperature had been reduced to 115° C. and the mixture was agitated for a period of 5 minutes in a laboratory steam-jacketed Lenhart mixer, poured into thin sheets, cooled to solidification, ground to a 20 mesh size, washed with isopropanol and vacuum dried. This product contained 14% cold pressed orange oil and 1¼% emulsifier.

As a further example of my process as modified to give a product suitable for use in beverages, a mixture consisting of 34.8 grams of cold pressed orange oil, which contained .05% 4-methyl-2,6-ditertiary butyl phenol and 20.2 grams of brominated vegetable oil having a specific gravity of 1.33, was added along with 4 grams of "Emargol" (a blend of monoglyceride sodium sulfo-acetate and mono-diglyceride) to 434 grams of 83° Brix corn syrup at a temperature of 119° C. Prior to weighing, the corn syrup had been heated to 121° C. After agitation the resulting emulsion was cooled to solidification, ground and washed with isopropanol. This product contained 11% brominated oil-cold pressed orange oil mixture and the usual odor and taste associated with brominated oils was absent.

An accelerated spoilage test in which an oil protected by my process and an unprotected oil were exposed to sunlight, heat, air and moisture simultaneously, showed that the untreated control (a cold pressed orange oil spread on the surface of granular sugar) began to show a very marked deterioration after 4 hours, even though the oil was protected with an antioxidant (.05% butylated hydroxyanisole). The same oil treated in accordance with the steps of my process, including the step of removing surface retained potentially pro-oxidant essential oil, was still of fairly good quality after 14 days of such exposure. Long term storage tests indicate that an essential oil, treated as herein disclosed, will have an ordinary storage life at room temperature or above of in excess of one year.

My solid particulate essential oil-corn syrup emulsion is particularly well suited for the preparation of dehydrated beverage products containing citric acid, sugar and fruit solids or other additional flavoring constituents. Such a dry product can be presented to the ultimate consumer who can prepare a beverage by merely dissolving the dehydrated product in water. My solid particulate emulsion is also well suited for use as a flavoring condiment for pastries and other food products.

It should be evident that my process may be employed with any of the other essential oils, as for example, lemon, lime, grapefruit, peppermint and wintergreen oils. I claim:

1. A process for preparing an oxidation protected essential oil solid emulsion which comprises heating a corn syrup solids solution to obtain a fluid to plastic syrup containing from 3% to 8½% moisture, adding a dispersing agent and an essential oil containing a heat stable, oil soluble antioxidant to said corn syrup solids solution at a temperature of the solution of from 85° C. to 125° C., emulsifying the resulting composition by agitation, forming a particulate solid emulsion, washing with an organic solvent for essential oil which is a nonsolvent for corn syrup, and drying to remove said solvent.

2. The process of claim 1 which includes the additional step of adding a brominated vegetable oil to said corn syrup solids solution prior to the addition of essential oil to said solution.

3. A process for preparing an oxidation protected citrus oil solid emulsion which comprises adding to citrus oil an antioxidant and a dispersing agent, heating a corn syrup solids solution to remove moisture to from 3% to 8½%, adding said citrus oil to said corn syrup solids solution at a temperature of the solution of from 85° C. to 125° C., emulsifying said composition with a minimum incorporation of air by agitating said composition, forming a particulate solid emulsion, washing with an organic solvent for citrus oil which is a nonsolvent for corn syrup and drying to remove said solvent.

4. A process for preparing an oxidation protected essential oil solid emulsion which comprises adding an oil soluble heat stable antioxidant to essential oil, adding the antioxidant containing essential oil and a dispersing agent to a corn syrup solids solution having a moisture content of between 3% and 8½% at a temperature of between 85° C. and 125° C., agitating the resulting essential oil-corn syrup solids solution to form a finely dispersed essential oil emulsion, forming a particulate solid emulsion, washing with an organic solvent for essential oil which is a nonsolvent for corn syrup and drying to remove said solvent.

5. A process of preparing an oxidation protected essential oil solid emulsion which comprises heating corn syrup to reduce the moisture content thereof to within the range of from 3% to 8½% moisture, adding essential oil containing an antioxidant and a dispersing agent to said corn syrup at a temperature of between 85° C. and 125° C., agitating to form a finely dispersed emulsion, forming a solidified finely dispersed emulsion, washing the ground particles with an organic solvent for essential oil which is a nonsolvent for corn syrup and drying to remove said solvent.

6. A process for preparing an oxidation protected essential oil solid emulsion which comprises heating a corn syrup solids-syrup mixture having a moisture content of between 3% and 8½% to obtain a fluid to plastic consistency, adding an essential oil containing an antioxidant and dispersing agent to the mixture at a temperature of between 85° C. and 125° C., emulsifying the resulting essential oil-corn syrup solids-syrup mixture by agitation, forming a solidified finely dispersed emulsion, washing with an organic solvent for essential oil which is a nonsolvent for corn syrup and drying to remove said solvent.

7. A corn syrup solids-essential oil emulsion in solid particle form, the particle surfaces of which are free from essential oil, containing minor amounts of an oil soluble heat stable antioxidant and a dispersant.

8. A corn syrup solids-essential oil-brominated oil emulsion in solid particle form, the particle surfaces of which are free from essential oil and brominated oil, containing minor amounts of an oil soluble heat stable antioxidant and a dispersant.

References Cited in the file of this patent
UNITED STATES PATENTS

| | | |
|---|---|---|
| 2,566,410 | Griffin | Sept. 4, 1951 |
| 2,657,997 | Rusoff et al. | Nov. 3, 1953 |